Dec. 24, 1935.   M. J. KERMER   2,025,059
EVAPORATOR
Filed July 7, 1934
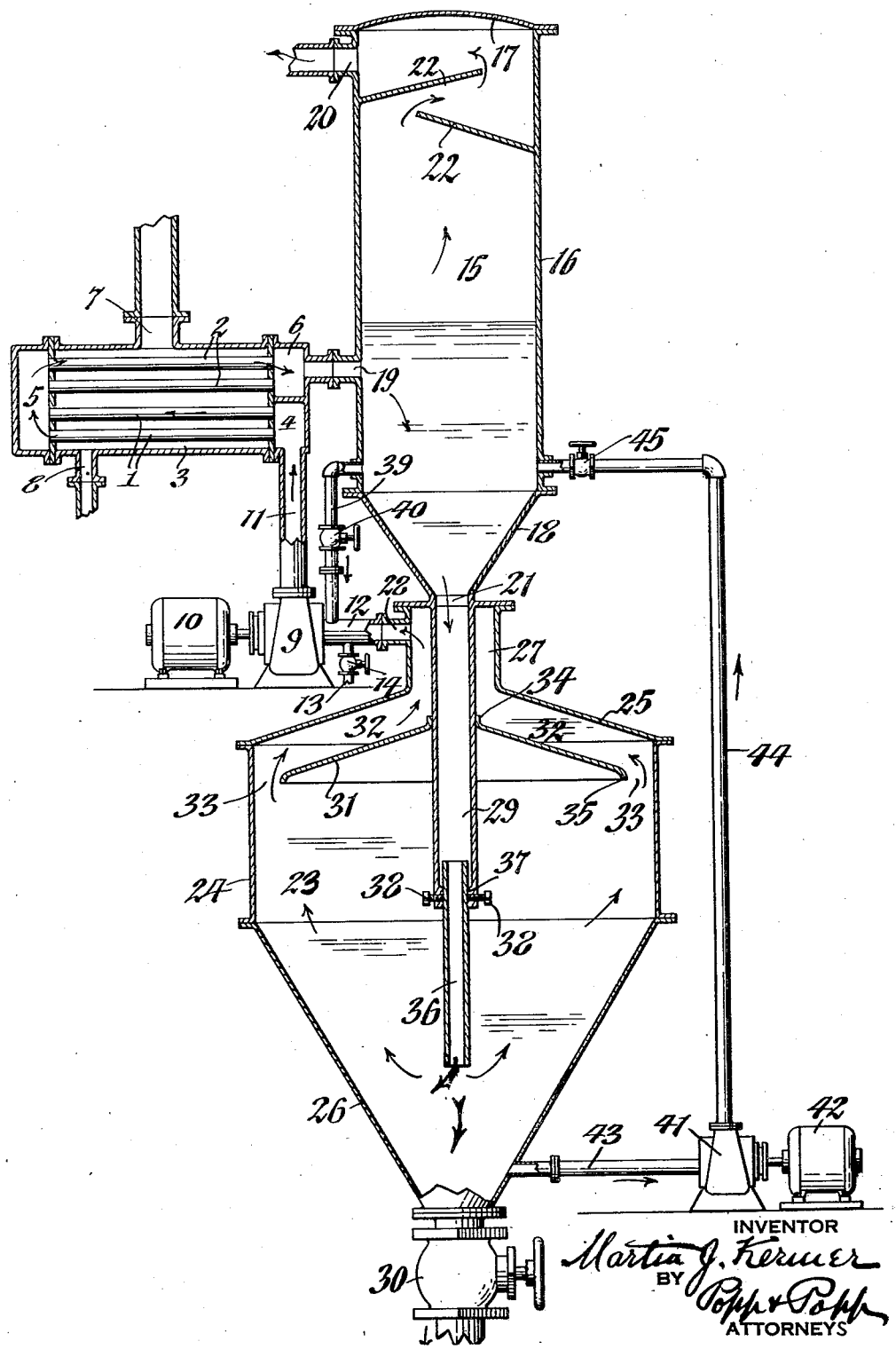
INVENTOR
Martin J. Kermer
BY Popp & Popp
ATTORNEYS Patented Dec. 24, 1935

2,025,059

UNITED STATES PATENT OFFICE 2,025,059

EVAPORATOR

Martin J. Kermer, Buffalo, N. Y., assignor to Buffalo Foundry & Machine Co., Buffalo, N. Y., a corporation of New York Application July 7, 1934, Serial No. 734,224

5 Claims. (Cl. 159—45)

This invention relates to an evaporator which is more particularly intended for crystallizing the solid contents in liquids and separating the crystals or salts from the liquid.

The object of this invention is to provide an evaporator for this purpose which will promote the growth of the crystals and enable the maximum quantity of crystals to be produced and be separated from the liquid for a given size of apparatus, and thereby effect a considerable economy in the cost of installation, and also effect substantial economy in the amount of space required for this purpose.

In the accompanying drawing:—

The figure is a vertical section of a satisfactory form of apparatus embodying my improvements.

The evaporator in its general organization comprises a heater whereby the liquid containing the crystallizable ingredients or solids are heated, a vapor separator or catch-all which receives the heated vapors from the heater and in which the vapors and liquids are separated, a crystal separator which receives the crystal-laden liquid from the vapor separator and separates the crystals therefrom, and a pump which removes the liquid from the crystal separator and returns the same to the heater and thus maintains a circulation of the liquid in the apparatus for repeatedly subjecting the same to the heating operation, vapor separating operation and crystal separating operation.

Although the heater may be of any suitable and well-known construction, that shown in the drawing is typical of one appropriate for this purpose, and as there shown this heater comprises a plurality of sets of horizontal heating tubes 1 and 2 arranged one above the other, a heating chamber 3 enclosing said tubes, an inlet chamber 4 for the liquid to be evaporated connected with one end of the lower set of tubes, a transfer chamber 5 connecting the opposite ends of the lower set of tubes with the corresponding set of upper tubes, a liquid outlet chamber 6 connected with the opposite end of the upper set of tubes; a heat supply inlet 7 for admitting a heating medium, such as steam, to the upper part of the heating chamber 3, and a condensate outlet 8 communicating with the lower part of the heating chamber and adapted to carry off the water of condensation of the steam or the residue of any other heating medium which may be used.

The liquid to be heated passes from the inlet chamber 4 lengthwise through the lower set of tubes 1 and into the transfer chamber 5, thence from the latter and lengthwise through the upper set of heating tubes 2 and into the outlet chamber 6 of the heater during which time the liquid is heated by the heating medium surrounding these tubes in a manner which is well-known in this art.

The liquid to be heated is preferably supplied under pressure to the inlet chamber 4 of the heater by a pump 9 which may be of any suitable construction and may be operated by power derived from any suitable source, such as an electric motor 10. The outlet 11 of this pump communicates with the liquid inlet chamber 4 and the inlet 12 of this pump communicates with the pipe 13 which is adapted to supply fresh or raw liquor, and contains a valve 14 regulating the same, and also communicates with other parts of the apparatus for maintaining circulation of liquid in the apparatus.

The vapor separator or catch-all is provided with an upright separating chamber 15 which is formed within an upright body or wall 16 having an upper cover 17 which closes the top of the chamber, and a downwardly tapering bottom 18. Between the upper and lower ends of the body of this vapor separating chamber the same is provided with an inlet 19 which communicates with the outlet chamber 6 of the heater and operates to carry the heated crystal-laden liquid from the outlet of the heater to the central part of the vapor separating chamber.

At its upper end the vapor separating chamber is provided with a vapor outlet 20 through which the vapors separated from the liquid escape from the separating chamber 15. An exhausting effect is produced upon this outlet of the vapor separating chamber by connecting the same either with the next following effect of the evaporating apparatus or the same may be connected with a condenser or an exhausting device of any approved form such as commonly used in this industry.

At its lower end this vapor separating chamber is provided with an outlet 21 for the heated crystal-laden liquid. In order to prevent any liquids which may become entrained in the vapors from escaping through the vapor outlet 20 baffle means are provided which are adapted to intercept such entrained liquid and return the same to the liquid in the lower part of the vapor separating chamber. In the preferred construction these baffle means consist of a plurality of inclined plates 22 which are arranged one above the other in the upper part of the vapor separating chamber, and extend alternately inwardly from the opposite side walls of this chamber so that the vapors passing upwardly through the vapor separating chamber to the outlet 20 are compelled to take a serpentine or zig-zag course, whereby any liquid entrained in the vapors is deposited on the underside of the baffle plates 22, and from thence runs down the walls of the vapor separating chamber to the liquid in the lower end of the latter.

The crystal or salt separator comprises a main separating chamber 23 which is formed within an upright body 24, an upwardly tapering head or cover 25 connected with the upper end of the body, and a downwardly tapering or conical bottom 26 connected with the lower end of this body.

On the central part of the head or cover 25 forming the top of the separating chamber 23 is an upwardly projecting dome 27 which is preferably concentric with the crystal separating chamber and of smaller diameter than the body of the latter.

This dome is provided on one side with an outlet 28 which is connected with the inlet 12 of the circulating pump 10. Arranged centrally within the dome 27 and projecting downwardly therethrough is an upright delivery tube 29 which communicates at its upper end with the lower or small end of the conical bottom 19 of the vapor separator body, while the lower end of this delivery tube terminates below the dome and the top of the crystal separating chamber, and at a point adjacent to the central part of the space within this chamber.

At the lower or small end of the conical bottom 26 of the crystal separating chamber the same is provided with a valve 30 of any suitable construction whereby the crystals or salts may be removed from the lower part of the crystal separating chamber without interfering with the normal operation of the apparatus.

The numeral 31 represents an annular baffle of upwardly tapering conical form arranged around the delivery tube 29 within the upper part of the crystal separating chamber 23. The angle of the conical form of this baffle is the same or substantially the same as the angle of the upwardly tapering conical head or cover 25 of the crystal separating chamber, and this baffle is separated from the top of this chamber by an upwardly tapering conical passage 32 which communicates at its upper end with the lower end of the dome 27 while the lower end of this passage communicates with the lower part of the space within the crystal separating chamber by an annular passage 33 formed between the periphery of the baffle 31 and the adjacent part of the wall 24 of the crystal separating chamber.

At its inner edge the baffle 31 is provided with an upwardly projecting collar 34 which surrounds the delivery tube 29 and is secured thereto by any suitable means, such as brazing, welding or the like.

At its outer edge this baffle 31 is provided with a downwardly projecting annular flange 35.

As the crystal or salt-laden liquid issues from the lower end of the delivery tube 29, the salts or crystals in this liquid, due to their greater weight, drop into the lower part of the crystal separating chamber, from which they are removed through the discharge valves 30 as required, while the liquor, freed from salts or crystals, passes upwardly from the lower end of the delivery tube 29 and also outwardly toward the wall of the crystal separating chamber, thence upwardly through the annular passage 33 between the baffle 31 and the wall of the crystal separating chamber, and thence inwardly through the conical passage 32 to the dome 27, from which latter the liquid is withdrawn by the pump 9 and delivered to the heating apparatus for recirculation through the same.

The crystal or salt-laden liquor passes downwardly through the delivery tube 29 at a considerable velocity, whereby the heavier salts or crystals therein are thrown with force toward the bottom of the crystal separating chamber, but during the movement of the liquid in a reversed or upward direction from the lower end of the delivery tube 29 and toward the wall of the separating chamber, this liquid spreads out radially in all directions, whereby the velocity or speed of the liquid at this time is materially reduced and the salts or crystals in the liquid are enabled to separate from the liquor and drop to the bottom of the crystal separating chamber, thereby reducing the liability of carrying salts or crystals from the crystal separating chamber back to the heating apparatus. This spreading out of the liquor during its upward passage in the crystal separating chamber is increased due to the baffle 31 which compels the liquor to travel the entire distance from the lower end of the delivery tube 29 to the wall of the crystal separating chamber before it reaches the annular passage 33, thereby materially reducing the speed of flow of the liquid as compared with the speed at which it issues from the lower end of the delivery tube 29, and thus materially aids the crystals or solids to separate by gravity from the liquor before the latter is returned from the crystal separator by the pump to the heater for recirculation in the apparatus.

Due to the upward inclination of the upper side of the baffle 31 any salts or crystals which may be separated from the liquor in the conical passage above this baffle and deposited on the upper side of the latter will tend to slide by gravity downwardly on this baffle to the outer edge thereof and from thence drop through the liquid in the crystal separating chamber to the bottom of the latter. By providing the outer edge of this baffle 31 with a downwardly projecting annular flange 35, this baffle is not only strengthened but the crystals escaping from the outer edge of this baffle will be directed by this flange in a mass downwardly into the liquor and thus aid in delivering the same to the lower part of the crystal separating chamber instead of permitting these crystals to be diffused through the upwardly flowing stream of liquor which otherwise might cause the same to be again entrained in the liquor so that further separation of the same will be required.

By arranging the baffle 31 and the cover or top 25 of the crystal separating chamber at the same angle, the upward and inward flow of liquid from the side wall of the crystal separating chamber to the dome 27 will be substantially uniform and thus cause a uniform distribution of upward and outward flow of liquid in the crystal separating chamber, and insure uniformity in the crystal or salt separating effect within the chamber 23.

It has been found in practice that the point at which the liquor is delivered from the lower end of the delivery tube 29 into the crystal separating chamber must be varied in order to obtain the best results when using the apparatus for evaporating liquors having different kinds of crystals, also to adapt the apparatus to obtain the best results when operating upon liquids varying in the amount of crystal content, and also to suit different speeds at which the liquor may be circulated through the apparatus.

To accomplish this purpose the delivery tube 29 is provided with a tubular extension 36 which has its upper end connected by a telescopic joint with the lower end of the delivery tube 29 so that the lower end of this extension can be raised or lowered and arranged at different distances from the top of the separating chamber as may be necessary to secure the best results when operating upon a particular kind of liquor from which the salts or crystals are to be extracted.

In the preferred construction the telescopic joint between the delivery tube 29 and the tubular extension 36 is effected by providing the inner side of the lower end of the delivery tube 29 with an annular bead 37 in which the extension tube 36 is fitted so as to be capable of sliding lengthwise therein, and after this extension tube has been adjusted vertically to the required position, the same is held in place by a clamping device which may be of any suitable construction, such for example as a plurality of clamping screws 38 mounted on the lower part of the delivery tube 29 and engaging with the periphery of the extension tube 36.

For the purpose of causing the crystals to grow larger in the passage of the liquor from the vapor separator into the crystal separator, and thence upwardly to the outlet of the latter, means are provided for slowing down the return flow of the liquor. This is preferably accomplished by passing some of the liquor around the crystal separator from the vapor separator to the heater so that less liquor will pass through the crystal separator, whereby the movement of the liquor through the crystal separator will be reduced in speed and the crystals in this liquor are permitted to grow larger within the crystal separator before being precipitated to the bottom thereof.

The by-passing of the liquor from the vapor separator to the heater may be effected in various ways but is preferably accomplished by means of a by-pass pipe 39 having its upper end connected with the lower part of the vapor separator and its lower end connected to the inlet of the pump 9, so that the pump will draw liquor simultaneously from the lower end of the vapor separator and also from the upper end of the crystal separator. The passage of liquor through the by-pass pipe 39 may be regulated in amount or cut off entirely to suit different requirements by means of a valve 40 in this pipe.

In some cases it is desirable to return some of the crystals from the lower part of the crystal separator directly to the vapor separator in order to enable these crystals to grow larger without heating the same. The means for accomplishing this purpose preferably consist of a pump 41 which may be driven either by an electric motor 42 or otherwise and which has its inlet connected by a pipe 43 with the lower part of the crystal separator, while its outlet is connected by means of a pipe 44 with the lower part of the vapor separator. The amount of crystal-laden liquid which is transferred by means of this pipe from the crystal separator to the vapor separator may be regulated or shut off altogether by means of the valve 45 arranged in the outlet pipe 44.

By means of this apparatus it is possible to handle various kinds of liquids which are to be evaporated for recovering the crystallizable solids therein and also to handle this liquid in such manner that the maximum size of the crystals and also the greatest quantity of crystals is obtained from the liquor for a given expenditure of heat and size of apparatus.

I claim as my invention:—

1. An evaporator including a crystal separator adapted to separate liquid and crystals and having a body provided on its top with a central dome which is of smaller diameter than said body, said body having an outlet for crystals in its lower part and said dome having an outlet for liquid; an inlet pipe for crystal-laden liquid projecting downwardly through the central part of said dome into the central part of said body and terminating adjacent to the lower end of said body, and an annular baffle arranged around the inlet pipe within the upper part of said body and spaced from the top of the body and also spaced at its outer edge from the side wall of the same.

2. An evaporator including a crystal separator adapted to separate liquid and crystals and having a body provided on its top with a central dome which is of smaller diameter than said body, said body having an outlet for crystals in its lower part and said dome having an outlet for liquid; an inlet pipe for crystal-laden liquid projecting downwardly through the central part of said dome into the central part of said body and terminating adjacent to the lower end of said body, and an annular baffle arranged around the inlet pipe within the upper part of said body and spaced from the top of the body and also spaced at its outer edge from the side wall of the same, said baffle being of downwardly flaring form and provided at its inner edge with a collar fitting around said inlet pipe and also provided at its outer edge with an annular downwardly projecting flange.

3. An evaporator including a liquid heater having a liquid inlet and a liquid outlet, a vapor separator having a liquid inlet communicating with the liquid outlet of said heater, a liquid outlet and a vapor outlet, a crystal separator having an inlet for crystal-laden liquid and communicating with the liquid outlet of said vapor separator and having a lower crystal outlet and an upper liquid outlet which communicates with the liquid inlet of said heater, and a by-pass establishing communication between said vapor separator and the inlet of said heater.

4. An evaporator including a liquid heater having a liquid inlet and a liquid outlet, a vapor separator having a liquid inlet communicating with the liquid outlet of said heater, a liquid outlet and a vapor outlet, a crystal separator having an inlet for crystal-laden liquid and communicating with the liquid outlet of said vapor separator and having a lower crystal outlet and an upper liquid outlet which communicates with the liquid inlet of said heater, a pump having its inlet connected with the liquid outlet of said crystal separator and its outlet connected with the inlet of said heater, and a by-pass pipe connected at one end with the lower end of said vapor separator and its other end with the inlet of said pump and provided with a valve.

5. An evaporator including a liquid heater having a liquid inlet and a liquid outlet, a vapor separator having a liquid inlet communicating with the liquid outlet of said heater, a liquid outlet and a vapor outlet, a crystal separator having an inlet for crystal-laden liquid and communicating with the liquid outlet of said vapor separator and having a lower crystal outlet and an upper liquid outlet which communicates with the liquid inlet of said heater, and a return pump having its inlet connected with the lower part of said crystal separator and its outlet connected with said vapor separator.

MARTIN J. KERMER.